United States Patent [19]

Meier

[11] Patent Number: 5,701,669
[45] Date of Patent: Dec. 30, 1997

[54] REPAIR METHOD FOR LENGTHENING TURBINE BLADES

[75] Inventor: Reinhold Meier, Dorfen, Germany

[73] Assignee: MTU Motoren- und Turbinen-Union Muenchen GmbH, Munich, Germany

[21] Appl. No.: 761,928

[22] Filed: Dec. 9, 1996

[30] Foreign Application Priority Data

Dec. 21, 1995 [DE] Germany ............... 195 47 903.3

[51] Int. Cl.$^6$ ..................................................... B23P 15/00
[52] U.S. Cl. ................... 29/889.1; 29/402.16; 29/281.6
[58] Field of Search .................. 29/889.1, 402.09, 29/402.16, 238, 281.1, 281.6

[56] References Cited

U.S. PATENT DOCUMENTS

| | | | |
|---|---|---|---|
| 4,657,171 | 4/1987 | Robins | 29/402.09 |
| 4,726,104 | 2/1988 | Foster et al. | |
| 4,804,815 | 2/1989 | Everett. | |
| 4,903,888 | 2/1990 | Clark et al. | 29/889.1 |
| 5,142,778 | 9/1992 | Smolinski | 29/889.1 |
| 5,210,946 | 5/1993 | Monroe | 29/889.1 |
| 5,359,770 | 11/1994 | Brown et al. | 29/889.1 |
| 5,363,554 | 11/1994 | Partridge et al. | 29/889.1 |
| 5,448,828 | 9/1995 | Willems et al. | 29/889.1 |
| 5,522,134 | 6/1996 | Rowe et al. | 29/889.1 |

FOREIGN PATENT DOCUMENTS

| | | |
|---|---|---|
| 0176942 | 4/1986 | European Pat. Off. . |
| 0276404 | 8/1988 | European Pat. Off. . |
| 0558870 | 9/1993 | European Pat. Off. . |
| 0562130 | 9/1993 | European Pat. Off. . |
| 4141927 | 6/1993 | Germany . |
| 4327189 | 2/1995 | Germany . |
| 62-282796 | 12/1987 | Japan . |
| 197801 | 1/1978 | Netherlands ............ 29/889.1 |

*Primary Examiner*—Irene Cuda
*Attorney, Agent, or Firm*—W. G. Fasse; W. F. Fasse

[57] ABSTRACT

In a repair method for lengthening turbine blades having undersized blade lengths, a sheet metal strip is preformed in a U-shape and is then used as a support form, for which it is tightly pressed against the upper blade contour in a force-locking and exactly contour-fitting manner by an outer synthetic material surround molding. The sheet metal strip is arranged in such a manner that it protrudes beyond the blade tip and protrudes out of the pressing synthetic material mass. In order to lengthen the turbine blade, the space within the sheet metal strip that protrudes beyond the blade tip is filled by laser deposit or build-up welding. Furthermore, a particular support form is provided for carrying out the lengthening of the turbine blade, and a method for producing the support form is described.

24 Claims, 3 Drawing Sheets

REPAIR METHOD FOR LENGTHENING TURBINE BLADES

FIELD OF THE INVENTION

The invention relates to a repair method for lengthening turbine blades having undersized or sub-standard blade lengths.

BACKGROUND INFORMATION

Undersized turbine blades or bucket vanes are regularly detected and collected during maintenance and repair of turbine engines. The undersized turbine blades are classified and are then assigned to repaired housing jacket rings corresponding to the classification. If, however, the extent of the undersize condition reaches a magnitude that prevents the further use of the turbine blades in a corresponding engine stage, then the under-sized turbine blades must be sorted out. As a result of this process, turbine blades will only be reused one time on average, and thereafter must be sorted out, since the turbine blades have become exceedingly too short to be further reused, due to the operation of the turbine.

A value-maintaining or value-increasing procedure, by which undersized turbine blades can be lengthened to a standardized size during each maintenance operation, has previously not been economical in view of the known costly methods for repairing turbine blades.

As an example, German Patent 4,141,927 discloses a method by which the blade tip of a turbine blade can be lengthened in an inductive pre-warming apparatus by means of build-up or deposit welding. This known method suffers the disadvantage that it requires a high expenditure on equipment in order to achieve the lengthening of an undersized turbine blade. As another disadvantage, this known method requires a high expenditure in finishing or after-machining work in order to finish the built-up weld metal, which is deposited in the form of overlapping weld beads, in such a manner that the built-up weld metal lengthens the turbine blade in a contour-conforming manner without altering or damaging the form or size of the blade contour and the blade profile while matching the weld metal overhangs to the blade contour and profile. Automatic grinding machines or other chip removing machining tools such as milling machines or planing machines must be adapted and set into use for carrying out these finishing operations. Typically, a milling machine is used to perform the contour-conforming machining operation, and planing machines or automatic grinding machines can be used for finishing the blade length.

European Patent Application No. 92-104,936.7, published under the European Publication No. 0,562,130 A1, describes an apparatus which uses copying rollers that are followingly guided along a contour-conforming boundary surface in the area of the build-up weld puddle. This apparatus and the method for lengthening turbine blades that can be realized therewith are also complicated, labor intensive, and cost intensive. Thus, this known method and apparatus are not suitable for achieving a cost economical lengthening of turbine blades having narrow cross-sections, complicated blade profiles or small dimensions, as are typical in high pressure compressor stages of turbines. German Patent 4,327,189 discloses a method for repairing turbine blades by means of which a repair part in the form of a repair plate is butt-welded onto the remaining blade portion in order to lengthen the blade. Thereafter, the oversized repair plate must be machined so as to conform its contour to that of the turbine blade. This method is also too complicated and costly in the after-machining or finishing of the repair plate, in order to be put into use for a procedure as described above during the maintenance and repair of turbine engines.

OBJECTS OF THE INVENTION

In view of the above discussion, it is an object of the invention to provide a repair method for lengthening turbine blades in a contour-conforming manner without a costly expenditure in equipment or cost intensive finishing or after-machining operations. Further objects of the invention are to provide a secure boundary for the deposited material that is to be built-up to form the lengthened extension, and to make possible the standardized lengthening of even the smallest turbine blades to a prescribed standardized size. It is further an object of the invention to provide a cost economical method of producing such a secure boundary for a lengthened extension of a turbine blade. Moreover, the invention aims to overcome the further disadvantages of the prior art discussed above.

SUMMARY OF THE INVENTION

The above objects have been achieved in a repair method for lengthening turbine blades having undersized blade lengths according to the invention, wherein a sheet metal strip is preformed in a forked or U-shaped manner and is pressed as a support form tightly and closely against the upper blade contour in a frictionally force-locking and contour-fitting manner by means of an outer synthetic material surround molding. In this connection, the sheet metal strip is arranged in such a manner that it protrudes beyond the blade tip and protrudes out of the synthetic material mass pressing the sheet metal strip against the blade contour. Further according to the invention, for lengthening or extending the blade, the area or space enclosed within the sheet metal strip protruding beyond the tip of the blade is filled in by means of laser build-up or deposit welding.

Advantageously, such a repair method according to the invention does not require a contour-conforming finishing or after-machining of the lengthened portion or extension of the turbine blade. Furthermore, the present method has the advantage that the preformed fork-like or U-shaped sheet metal strip can be reused multiple times, and also the synthetic material can be reprocessed by simple means, such as melting or deep freezing, to be reused multiple times for surround molding and pressing the sheet metal strip against the blade contour. As a result, the material utilization and material consumption for the support form is held within tight limits.

Surround molding with synthetic materials in this manner has been proved to be a cost economical method in mass production of goods. However, synthetic materials would typically not be suitable for the high melting temperatures of the materials of the turbine blades. Nonetheless, according to the invention, the temperature sensitive surround-molded synthetic material mass is sufficiently shielded so that the synthetic material mass effectively presses the sheet metal strip in a contour-conforming manner against the blade contour throughout and until the completion of the build-up or deposit welding operation, without itself becoming melted or burned. To achieve this shielding and protection of the synthetic material, the invention provides an advantageous combination of laser deposit welding, which is associated with a low average or overall introduction of heat but a high local introduction of heat, and a thin diaphragm screen, which protects the synthetic material mass from thermal radiation and scattered laser light from the sheet metal strip.

In a preferred embodiment of the method, the fork-like or U-shaped sheet metal strip protrudes outwardly beyond the trailing edge of the blade on both sides thereof, so that a hollow space is formed between the blade trailing edge and the protruding region of the sheet metal strip, for accommodating a run-out or over-shoot path of the laser beam during the laser deposit welding procedure. The provision of such a run-out area for the laser beam avoids the situation in which the laser beam is stationary and thus heats the same spot in the area of the blade tip for a long period of time, so that the support form is not thermally overloaded and damaged in the area of the synthetic material mass. By providing the hollow space it is ensured that no repair surfaces are heated by the laser during the start-up and the run-out of the laser beam.

Preferably, metal powder is delivered or supplied concentrically with the laser beam during the laser deposit welding. Advantageously in this embodiment, the quantity of added material that is to be heated by the laser beam is exactly that quantity that is necessary for lengthening the turbine blade in an exact con- tour-matching manner. Thereby, the heat energy that is to be applied can be minimized. Furthermore, the concentric supply of the metal powder ensures that a uniform heating of the powder particles is achieved.

In a further preferred manner of carrying out the method for lengthening the turbine blade, the base alloy of the blade is applied in powder form, under simultaneous heating with a laser beam, onto the blade tip in the area of the protruding sheet metal strip. Applying the same type of material for lengthening the blade tip provides the advantage that an intimate internal connection or bonding between the extension or lengthened portion and the rest of the turbine blade can be achieved by the epitaxial growth of the applied material onto the crystallites of the base material of the turbine blade. A further advantage of using the same type or chemically identical materials, is that thermally induced stresses between the extension portion and the remaining rest part of the turbine blade can be minimized.

In order to lengthen the turbine blade according to an alternative embodiment of the invention, preferably first the base alloy of the blade, in the form of a powder bound in a binder, is applied in the area of the protruding sheet metal strip, such that the portion of the sheet metal strip protruding out beyond the blade tip is filled with the base alloy of the blade in powder form and the binder. Next, by heating with a laser beam, the binder can be evaporated and the powder can be joined onto the blade tip in the form of a contour-true extension of the blade. In this variation of the method, while extra energy must be applied for evaporating the binder in addition to the energy for heating the metal powder, on the other hand, however, the apparatus for carrying out the laser deposit welding can be substantially simplified in its apparatus features. Moreover, the additional application of evaporation energy does not necessarily lead to increased heating of the rest of the turbine blade and therewith an endangering of the support form, because the additionally applied energy for the binder is used up directly in the evaporation process of the binder by exactly adapting the parameters of the laser deposit welding. Furthermore, binders such as synthetic resins or low-melting metal alloys, such as solders, can be utilized, for which a relatively low evaporation heat is required.

Often the maintenance or repair of a turbine engine is combined with improvements in the blade tip grazing or touching characteristics of the turbine blades. Therefore, in a preferred manner of carrying out the method for lengthening the turbine blade by means of laser deposit welding, a hard casing or cladding of a metallic matrix with embedded hard material particles is applied onto the turbine blade tip in the area of the protruding sheet metal strip. This variation of the method achieves the advantage that the grazing hardness of the blade tip is increased, simultaneously with the lengthening of the rest of the blade. Especially when the blade lengths are trimmed to a desired standardized size, a blade tip that has been hardened by the above mentioned hard casing or cladding will maintain that standardized size for all blades of one stage for a long operating life.

The synthetic material mass that was used for the support form is preferably recovered for re-use after carrying out the extending or lengthening of the blade, by means of deep freezing the blade with the support form. Thereby, the synthetic material mass is split away from the blade and the sheet metal strip, since the synthetic material mass shrinks to a greater extent than the blade material and the sheet metal strip during the deep freezing procedure.

Another preferred possibility for recovering the synthetic material mass is achieved by melting the synthetic material mass of the support form by heating the blade, sheet metal strip and synthetic material mass. This has the advantage that the melted synthetic material can be directly provided to an injection molding machine for surround molding a next blade and fixing a corresponding sheet metal strip on the next blade.

According to a further preferred manner of carrying out the method, after the process of lengthening the blade is completed, the synthetic material mass of the support form is separated or dissolved away from the blade and the sheet metal strip by being submerged and melted in a molten bath of the same material as that of the synthetic material mass. After the synthetic material mass is removed or dissolved away from the blade and the sheet metal strip by the above described melting in the melting bath, the lengthened blade and the sheet metal strip are removed from the synthetic material bath and cleaned, while the molten synthetic material mass is again supplied to the process.

In a preferred embodiment of the invention, the support form for carrying out the lengthening of undersized turbine blades comprises a forked, yoked, or U-shaped pre-formed metallic sheet metal strip, that surrounds the upper blade contour. The sheet metal strip is pressed tightly against the upper blade contour in a closely fitting, force-locking, and contour-conforming manner by an outer surround molding of synthetic material. In this context, the sheet metal strip protrudes out of the synthetic material mass and protrudes beyond the blade tip for carrying out the exactly fitting and contour-conforming lengthening of the turbine blade by means of laser deposit welding.

This preferred support form has the advantage that it can automatically be fitted onto or against the turbine blade profile in a contour-conforming manner through a cheap injection molding process, and then remains in that position in a frictional force-locking manner until the lengthening process is completed. Thereby, the sheet metal strip not only determines the blade contour in the area of the extension, but also simultaneously protects the synthetic material mass from overheating, from heat radiation, and from scattered laser light. Due to the high thermal conductivity of the sheet metal strip as compared to the synthetic material mass, and due to a tight contact of the sheet metal strip against the turbine blade contour, the heat of the laser deposit welding process that is taken up in the sheet metal strip by heat radiation and heat conduction is advantageously conducted away directly into the rest of the turbine blade and not into the synthetic material mass.

The support form preferably comprises a synthetic material surround molding with ribs. These ribs advantageously serve to cool the synthetic material and also serve to compensate or even-out mechanical loads at critical locations. Furthermore, these ribs form nominal breaking points for bursting or fracturing off the synthetic material mass after the blade has been lengthened.

The sheet metal strip is preferably made of soft copper, bronze, or brass. Such materials may be deformed without a high exertion or application of energy, and may therefore be pressed against the blade profile in a contour-conforming manner without great difficulty by a lamellar or leaf diaphragm. The thermal conductivity of such sheet metal strips is greater than that of the synthetic material by orders of magnitude so that a shunting or leading-away of the lost heat from the laser deposit welding process to the rest of the turbine blade is assured, without endangering the contour-fitting pressing function of the synthetic material mass.

The sheet metal strip is made of tungsten for cases when the applied extension material has an extremely high melting point or when the length of the extension will exceed several millimeters. Tungsten is selected for the sheet metal strips in these situations, since tungsten can be heated to a substantially greater temperature, and does not undergo any bonding with any of the typical turbine blade alloys during the laser deposit welding process that continues for a few seconds.

If bonding or adhesion problems arise between the material of the sheet metal strips and the material for the blade extension, then the sheet metal strips are preferably provided with a suitable coating, which ensures that the sheet metal strip material can be readily removed or separated from the extension material after the laser deposit welding process has been completed.

Preferably, polystyrene has been successfully used as the synthetic material mass. This thermoplastic material has excellent clamping characteristics after being molded around a blade and sheet metal strip region, so that a frictional form-locking connection between the blade and the sheet metal strip is assured during the subsequent laser deposit welding. The polystyrene can be replaced by other thermoplastic synthetic materials, as long as the clamping function for the sheet metal strip is maintained.

For carrying out the invention a preferred, advantageous method for producing a support form for lengthening undersized turbine blades comprises the following method steps:

a) laying a flexible, forked or U-shaped preformed sheet metal strip against the upper blade contour;

b) pressing the sheet metal strip against the upper blade contour by means of an upper lamellar diaphragm;

c) contour-close sealing of the blade profile in the lower blade region by means of a lower lamellar diaphragm, while forming a closed space between the upper and lower lamellar diaphragms; and d) filling the closed space by injection molding with a synthetic material mass, while enclosing the blade region between the upper and lower lamellar diaphragms and pressing the lower region of the sheet metal strip against the blade contour by means of the synthetic material mass injected into the closed space.

Advantages of this method include the uncomplicated production of the support form by means of known production equipment for mass produced products, the relatively small expenditure of time necessary for preparing the starting materials such as the synthetic material mass and the forked or U-shaped sheet metal strip, and the small loss of material due to the reusability of the sheet metal strip and the synthetic material mass. In this manner, the support forms can be produced by an inexpensive method, that may be economically utilized even for the smallest turbine blade dimensions and turbine blade extensions.

The preferred method for producing the support form according to the invention using the above described method steps is physically tied to the object to be lengthened. However, this physical interconnection is not always necessary, especially if blade profiles that are conically tapered in the lengthwise direction are to be lengthened. In such cases, support forms can be mass-produced on a turbine blade pattern or model, and then simply pushed onto the respective turbine blade rest portion that is to be lengthened, before carrying out the laser deposit welding process.

Preferably the injection molding into the space enclosed between the upper and lower lamellar diaphragms is carried out under a pressure of over 1 to 10 MPa (i.e. over 10 to 100 bar). This pressure is to be adapted to the specific volume and degree of filling of the space that is to be filled by injection molding, and the structure of the lamellar diaphragms being used.

Preferably, soft copper, bronze or brass is used as the sheet metal strip material for carrying out a deposit welding of only a few millimeters, and tungsten is used as the sheet metal strip material for larger blade extensions. Furthermore, the sheet metal strips can be provided with a suitable coating, in order to assure that the sheet metal strips can be separated from the extension or lengthened portion of the blade after removing the synthetic material mass.

Preferably, thermoplastic synthetics, and especially polystyrene, are injected into the space between the upper and lower lamellar diaphragms as the above described synthetic material mass. These synthetic materials are preferred, because they may be reused almost without limitation by means of repeated melting, injection molding, and solidifying.

BRIEF DESCRIPTION OF THE DRAWINGS

In order that the invention may be clearly understood, it will now be described, by way of example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
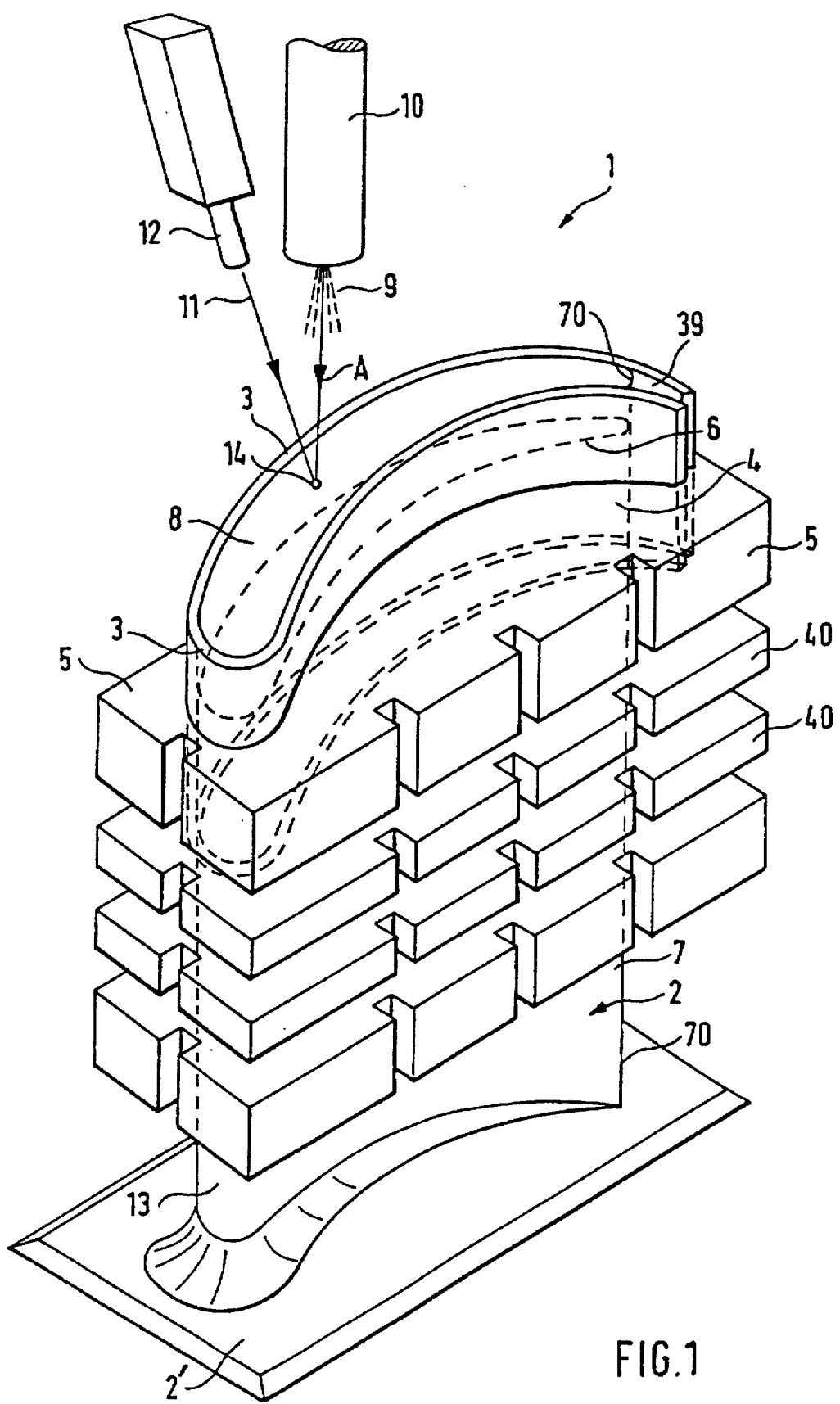
FIG. 1 is a perspective view of an arrangement for lengthening turbine blades according to the invention.

FIG. 1 shows an arrangement 1 for lengthening turbine blades 2, in a perspective view. The turbine blade 2 includes a vane or blade proper 7 and is mounted in any conventional manner on a rotor disk 2'. In order to carry out the lengthening process, a sheet metal strip 3 is first preformed in a forked, yoked or U-shape having two curved shanks generally matching the blade contour on two opposite surfaces of the blade 2. Then, to serve as a support form, the sheet metal strip 3 is arranged on the upper blade contour 4 and is pressed tightly against the upper blade contour 4 in a force-locking, or substantially rigid and frictionally nonslipping, and contour-fitting manner by an outer synthetic material surround molding 5. The sheet metal strip 3 is arranged in such a manner that it protrudes beyond the blade tip 6 and out of the synthetic material mass 5 that presses it against the upper blade contour 4.

In order to lengthen or extend the turbine blade proper or vane 7 of the blade 2, the area or region 8 within the sheet metal strip 3 that protrudes beyond the blade tip 6 is preferably filled up by means of laser build-up or deposit welding. The deposit material for forming the extension or lengthened portion of the blade is sprayed onto the blade tip 6 in the form of a powder 9 from a powder canon or spray gun 10 in the spray jet direction A. A laser beam 11 emitted by a laser beam gun 12 heats the powder mass 9 so that the powder material is bonded onto the blade tip 6, i.e. is deposit welded onto the blade tip in order to lengthen or extend the blade tip 6. The direction A of applying the powder 9 is preferably substantially concentric with the laser beam 11, or concentrically meets or intersects the laser beam 11 at its point of impingement 14.

In this example embodiment, the amount of the undersize condition of the blades and thus the required amount that the blades must be lengthened or extended is in the range from 0.1 to 3.5 mm, with a contour tolerance of less than 0.05 mm. To provide representative samples according to the invention, high pressure compressor guide vanes, high pressure compressor rotor vanes or blades, and intermediate pressure compressor rotor blades were lengthened or extended by the method according to the invention and were partially hard-cased or clad by the extension material.

Due to the point-shaped heating provided by the laser beam 11, the temperature of the rest or remaining portion 13 of the turbine blade and the temperature of the sheet metal strip 3 are not substantially elevated, so that the synthetic material mass 5 that presses the sheet metal strip 3 against the turbine blade profile during the few seconds of the laser deposit welding process may be a synthetic material having a relatively low softening temperature without loosing its clamping ability relative to the sheet metal strip 3. In this context, the softening temperature of the synthetic material is comparatively substantially lower than the local temperatures that arise at the point of impingement 14 of the laser beam 11 during the deposit welding, in order to be able to melt the material for the extension or lengthened portion of the blade. Alternatively, but less preferably, other known energy beams or heat sources may be used instead of the laser beam 11 to carry out the deposit welding.

Figure 2:
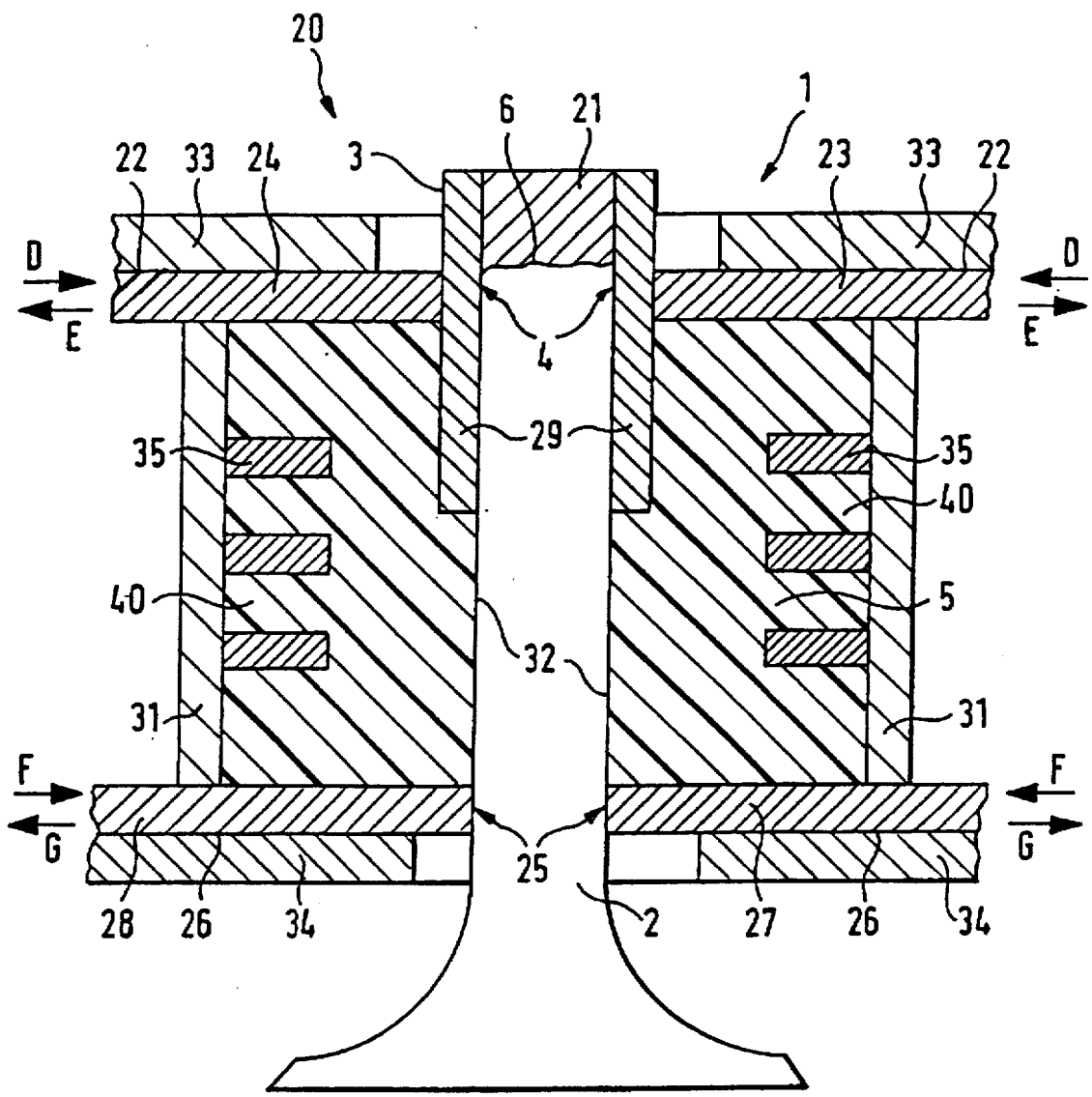
FIG. 2 is a cross-section through an arrangement for lengthening turbine blades according to the invention.

FIG. 2 shows a cross-section through an arrangement 1 for lengthening turbine blades 2. Before carrying out the lengthening process, it is necessary to produce a support form 20 that will make the contour-fitting extension 21 of the blade 2 possible. In order to achieve this, a flexible, forked or U-shaped preformed sheet metal strip 3 is placed against the upper blade contour 4 of the blade 2 and is then pressed against this upper contour region 4 in a contour-fitting manner by an upper lamellar or leaf diaphragm 22, having individual lamellae 23 and 24 which are shown in cross-section and which are slidably movable in the direction of arrows D and E. Simultaneously, the blade profile or contour of the lower blade region 25 is sealed in a contour-fitting or contour-close manner by a lower lamellar diaphragm 26, including individual lamellae 27 and 28 which are shown in cross-section and which are slidably movable in the directions of arrows F and G.

As a result of the above, a closed space is formed between the upper and lower lamellar diaphragms 22 and 26, and is respectively bounded by the diaphragms 22 and 26 and by sidewalls 31. A synthetic material mass 5 is then injected into the closed space in order to enclose a middle portion 32 of the turbine blade between the upper and lower lamellar diaphragms 22 and 26, and to press the lower portion 29 of the sheet metal strip 3 against the blade 2. The lamellae 23, 24, 27, and 28 of the diaphragms 22 and 26 can be supported or backed-up during the injection molding process by an upper and a lower support plate 33 and 34 respectively. If it is desired to interrupt or subdivide the synthetic material mass 5 by ribs 40, it is possible to insert cross-wise webs 35 into the injection mold, for example attached to the side walls 31, before injecting the synthetic material mass 5.

After completion of the synthetic material injection, the support plates 33 and 34, the diaphragms 22 and 26, the side walls 31, and the crosswise webs 35 if applicable, are removed, so that only the synthetic material mass 5 remains clamping the sheet metal strip 3 in a contour-conforming manner against the upper portion of the turbine blade 2. Next, the blade 2 will be lengthened in an exact contour-matching manner by depositing the extension material 21 in a few seconds by means of a laser deposit welding process. Finally, the synthetic material mass 5 and the sheet metal strip 3 are removed by deep-freezing the entire arrangement, whereby the synthetic material mass 5 bursts or spalls away from the turbine blade, and the sheet metal strip 3 is released so that it can be reused.

Figure 3:
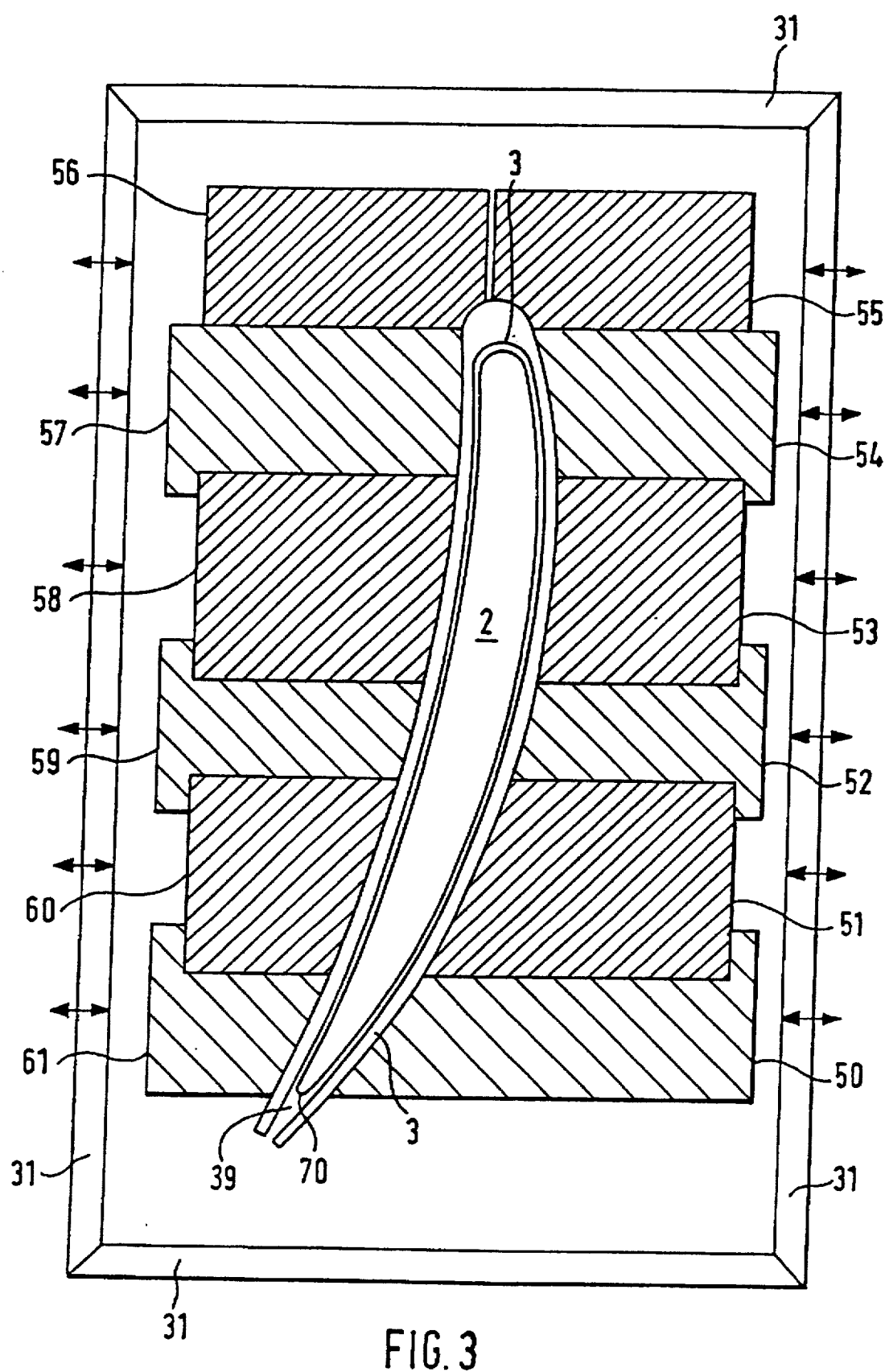
FIG. 3 is a top plan view of an arrangement for lengthening turbine blades according to the invention.

FIG. 3 is a top view of an arrangement for lengthening a turbine blade 2. The figure schematically shows a plurality of lamellae 50 to 61 of a corresponding lamellar diaphragm, which can press a sheet metal strip 3 in an exact contour-conforming manner against the blade profile. The sidewalls 31 surround the space to be filled-in by injection molding. For the sake of clarity, the support plates have been omitted in this drawing figure. Respective double-headed arrows show the possible directions of motion of the individual lamellae 50 to 61.

As shown in this drawing figure, the U-shaped sheet metal strip 3 is still open toward and along the trailing edge 70 of the blade 2, and will first be closed by application of the pressing force of the lamellae 50 and 61. Thereby, a hollow space 39 will be formed along the trailing edge 70 of the blade, which provides a sufficiently large space for the run-up and run-out of the laser beam at the beginning and the end of the laser deposit welding process.

Although the invention has been described with reference to specific example embodiments, it will be appreciated that it is intended to cover all modifications and equivalents within the scope of the appended claims, and that each feature described with regard to one embodiment also applies to all other embodiments to the extent that it is not incompatible therewith.

What is claimed is:

1. A method of lengthening a turbine blade, comprising the following steps:

(a) arranging a sheet metal strip along a blade contour of an end portion of said blade, such that a protruding part of said sheet metal strip protrudes beyond a blade tip of said blade;

(b) molding a synthetic material around at least a portion of said blade and a portion of said sheet metal strip so as to form an outer surround molding that tightly presses said sheet metal strip in a contour-fitting manner against said blade contour of said end portion of said blade, wherein at least a portion of said protruding part of said sheet metal strip protrudes out of said surround molding; and (c) applying deposit material onto said blade tip so as to lengthen said blade, by carrying out deposit welding in a space bounded by said protruding part of said sheet metal strip.

2. The method of claim 1, further comprising a preliminary step of pre-forming said sheet metal strip into a two-shanked curved U-shape generally matching said blade contour.

3. The method of claim 1, wherein said tight pressing of said step (b) comprises forming a frictional force-locking connection between said sheet metal strip and said end portion of said blade.

4. The method of claim 1, wherein said deposit welding of said step (c) is carried out so as to fill-in said space with said deposit material up to a free protruding edge of said protruding part of said sheet metal strip.

5. The method of claim 1, wherein said deposit welding of said step (c) comprises laser deposit welding including directing a laser beam into said space bounded by said protruding part of said sheet metal strip.

6. The method of claim 5, wherein said arranging of said step (a) is carried out such that said sheet metal strip has a two-shanked curved U-shape generally matching said blade contour, with two free ends of said sheet metal strip protruding beyond a trailing edge of said blade respectively from two sides of said blade so as to form a hollow space between said two protruding free ends of said sheet metal strip and said trailing edge of said blade, and wherein said laser deposit welding further comprises translating said laser beam and running-out a translational pass of said laser beam in said hollow space.

7. The method of claim 5, wherein said laser deposit welding further comprises supplying a metal powder for forming said deposit material concentrically with said laser beam.

8. The method of claim 5, wherein said laser deposit welding further comprises supplying a metal powder containing a base alloy of said turbine blade onto said blade tip while simultaneously heating said metal powder with said laser beam.

9. The method of claim 5, wherein said laser deposit welding further comprises a first step of supplying a metal powder containing powder particles of a base alloy of said turbine blade and a binder onto said blade tip so as to fill said space bounded by said protruding part of said sheet metal strip, and thereafter comprises a next step of said directing said laser beam to heat said metal powder so as to evaporate said binder and bond said powder particles onto said blade tip to form a contour-fitting extension on said blade tip.

10. The method of claim 1, wherein said deposit material comprises a metallic matrix and hard particles embedded in said matrix to form a hard casing.

11. The method of claim 1, further comprising a subsequent step after said step (c), of removing said synthetic material surround molding from said blade and said sheet metal strip by deep-freezing at least said surround molding.

12. The method of claim 1, further comprising a subsequent step after said step (c), of removing said synthetic material surround molding from said blade and said sheet metal strip by melting said surround molding.

13. The method of claim 12, wherein said melting of said surround molding comprises submerging at least said surround molding in a molten bath of said synthetic material.

14. A support form arrangement for lengthening a turbine blade by deposit welding, comprising an undersized turbine blade that is to be lengthened, a two-shanked sheet metal strip arranged in a contour-conforming manner against and surrounding a blade contour of an end portion of said turbine blade such that a protruding part of said sheet metal strip protrudes beyond a blade tip of said blade, and a synthetic material surround molding surrounding a portion of said sheet metal strip so as to press said sheet metal strip tightly against said blade contour and such that at least a portion of said protruding part of said sheet metal strip protrudes out from said surround molding.

15. The support form arrangement of claim 14, wherein said surround molding comprises a plurality of ribs.

16. The support form arrangement of claim 14, wherein said sheet metal strip essentially consists of a material selected from the group consisting of soft copper, bronze, and brass.

17. The support form arrangement of claim 14, wherein said sheet metal strip essentially consists of tungsten.

18. The support form arrangement of claim 14, wherein said sheet metal strip comprises a base strip member and a coating thereon.

19. The support form arrangement of claim 14, wherein said synthetic material of said surround molding essentially consists of polystyrene.

20. A method for producing a support form arrangement for lengthening a turbine blade, comprising the following steps:

(a) arranging a flexible sheet metal strip with at least an overlapping portion thereof against an upper blade contour of an upper end portion of said turbine blade;

(b) pressing said sheet metal strip against said blade contour using an upper lamellar diaphragm;

(c) sealing a lower lamellar diaphragm in a closely contour-fitting manner against a lower blade contour of a lower portion of said turbine blade, so as to form a closed space between said upper and lower lamellar diaphragms; and (d) injecting a synthetic material into said closed space so as to press said overlapping portion of said sheet metal strip against said upper blade contour and to enclose and surround a portion of said blade between said upper and lower diaphragms with said synthetic material.

21. The method of claim 20, wherein said injecting of said synthetic material is carried out at an injection pressure in a range from more than 1 MPa to 10 MPa.

22. The method of claim 20, wherein said sheet metal strip comprises a base material that essentially consists of a metal selected from the group consisting of soft copper, bronze, brass, and tungsten.

23. The method of claim 22, wherein said sheet metal strip further comprises a surface coating layer on said base material.

24. The method of claim 20, wherein said synthetic material essentially consists of polystyrene.

* * * * *